United States Patent [19]

Geller

[11] 4,333,104
[45] Jun. 1, 1982

[54] COLOR DEMODULATING APPARATUS WITH CROSS-COLOR CANCELLATION

[75] Inventor: William L. Geller, Framingham, Mass.

[73] Assignee: GTE Laboratories Incorporated, Waltham, Mass.

[21] Appl. No.: 130,944

[22] Filed: Mar. 17, 1980

[51] Int. Cl.³ .......................................... H04N 9/535
[52] U.S. Cl. ........................................ 358/23; 358/31
[58] Field of Search .................. 358/21 R, 22, 23, 24, 358/31, 35, 37, 40; 455/295, 303–307

[56] References Cited

U.S. PATENT DOCUMENTS

| | | | |
|---|---|---|---|
| 3,553,354 | 1/1971 | Gupta | 358/23 |
| 3,688,019 | 8/1972 | Weitzsch | 358/24 |
| 3,707,596 | 12/1972 | Kuhn | 358/31 |
| 4,096,516 | 6/1978 | Pritchard | 358/31 |
| 4,158,209 | 6/1979 | Levine | 358/31 |

FOREIGN PATENT DOCUMENTS

| | | | |
|---|---|---|---|
| 9204 | 12/1979 | Fed. Rep. of Germany | 358/23 |
| 5084242 | 1/1977 | Japan | 358/23 |

*Primary Examiner*—Tommy P. Chin
*Attorney, Agent, or Firm*—David M. Keay

[57] ABSTRACT

Color demodulating apparatus for a color television receiver. The chrominance signal is separated from other components of the composite video signal and sampled at the color subcarrier frequency to produce charges representative of the synchronously detected chrominance signal. The charges are applied to two CCD delay lines which introduce a delay differential at their outputs equal to the horizontal line period of the television receiver. The outputs of the CCD delay lines are combined in a summing network. Due to the interleaving principle present with standard NTSC signals the demodulated chrominance signals add and any unwanted high frequency luminance components cancel. The output of the summing network is lowpass filtered to produce a continuous color video signal which is free of cross-color effects.

6 Claims, 2 Drawing Figures

COLOR DEMODULATING APPARATUS WITH CROSS-COLOR CANCELLATION

BACKGROUND OF THE INVENTION

This invention relates to circuitry for processing color television signals. More particularly, it is concerned with apparatus for detecting color video signals from chrominance signals in color television receivers.

In color television receivers the chrominance signals are separated from the composite video signal as by appropriate filter arrangements. However, some high frequency luminance components pass through the bandpass filter separating out the chrominance signal. These unwanted components which are referred to as cross-color effects cause distortion in the colors of the display on the screen.

In order to reduce the cross-color effects so-called comb filters may be employed in addition to the usual color signal processing circuitry. Comb filters may be employed in both the luminance and the chrominance channels. The operations of these filters make use of the fact that in accordance with standard NTSC broadcast standards much of the luminance information is represented by signal frequencies concentrated about integral multiples of the horizontal line scanning frequency while the chrominance information is concentrated around frequencies which lie halfway between integral multiples of the line scanning frequency. Although the use of comb filters is an effective technique for eliminating cross-color distortion they are in addition to the circuitry required for processing and demodulating the chrominance and luminance signals, and thus add to the cost of color television receivers.

SUMMARY OF THE INVENTION

Apparatus in accordance with the present invention provides a simpler and less expensive arrangement for demodulating the chrominance signal in a color television receiver to obtain the color video signals while eliminating cross-color effects. The color demodulating apparatus includes filter means for separating the chrominance signal from the other components of the composite video signal. A sampling means coupled to the filter means samples the chrominance signal at the color subcarrier frequency. Delay means are coupled to the sampling means and provide separate first and second paths for each sample. The second path introduces a delay with respect to the first path which is equal to the horizontal line period of the receiver. A summing means is coupled to the delay means for adding the sample from the first path to the sample from the second path to produce a series of output pulses. The series of output pulses are smoothed by output filtering means to produce a continuous color video signal.

For a better understanding of the present invention, together with other and further objects, advantages, and capabilities thereof, reference is made to the following disclosure and appended claims in connection with the above described drawings.

DETAILED DESCRIPTION OF THE INVENTION

Figure 1:
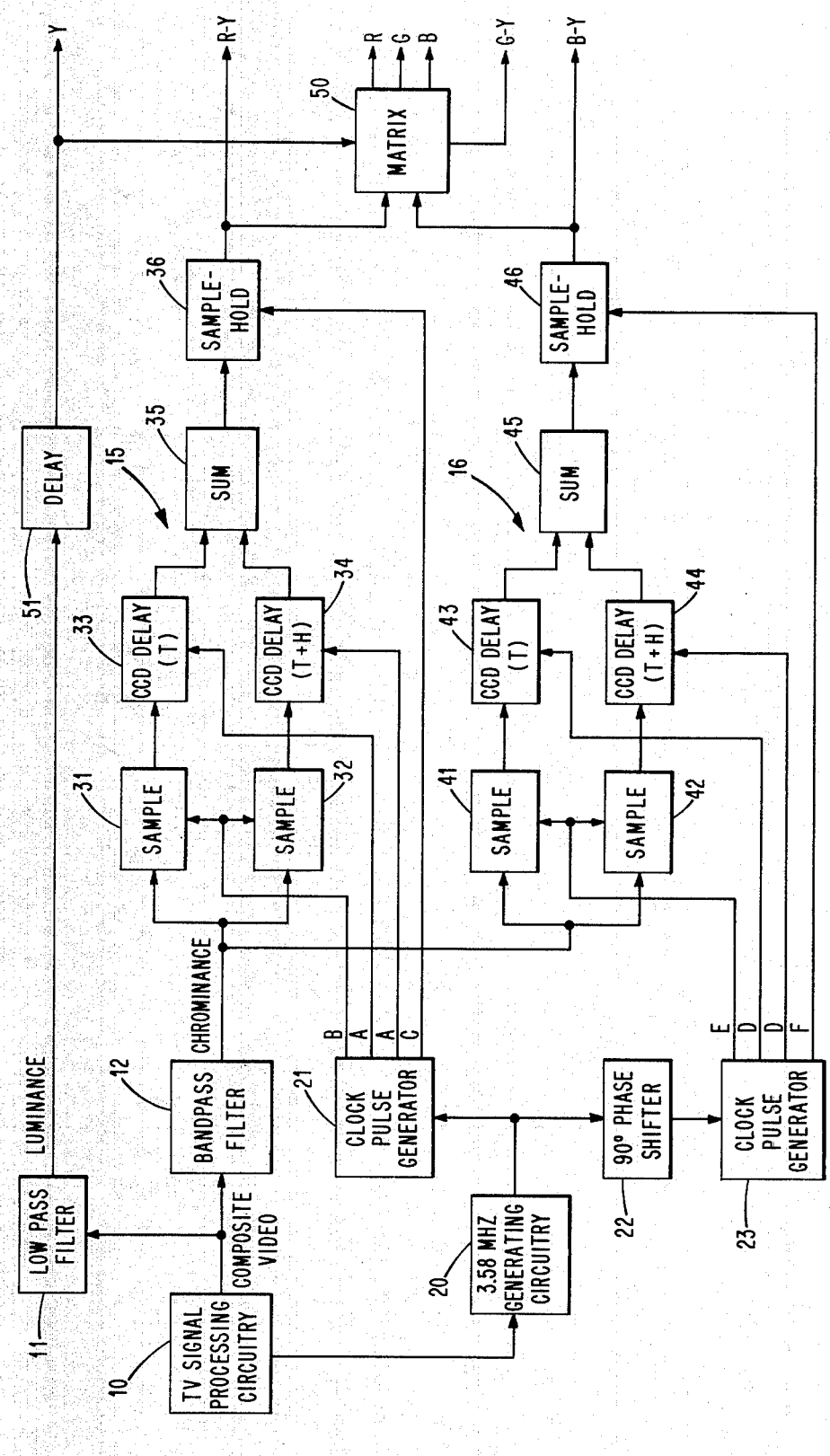
FIG. 1 is a schematic block diagram of portions of a color television receiver including color demodulating apparatus in accordance with the present invention.

In the schematic block diagram of FIG. 1 the TV signal processing circuitry 10 represents conventional elements within a color television receiver which produce the composite video signal including both the luminance and chrominance signals. The composite video signal is applied to a lowpass filter 11 and to a bandpass filter 12. The lowpass filter 11 passes the luminance signal and the bandpass filter 12 passes the chrominance signal. The so-called cross-color effects which have been discussed hereinabove occur in prior art apparatus because certain of the higher frequency components of the luminance signal are also passed by the bandpass filter 12 along with the desired chrominance information.

As is well-known the chrominance information is carried in the color subcarrier which has a nominal frequency of 3.58 MHz. Encoded in the color subcarrier are two color video signals, the R-Y and the B-Y signals, in quadrature. It is a function of the color demodulating circuit to detect the R-Y and B-Y color video signals in the chrominance signal. In the apparatus as shown in FIG. 1 the R-Y signal is detected in a first channel 15 and the B-Y signal is detected in a second channel 16.

Figure 2:
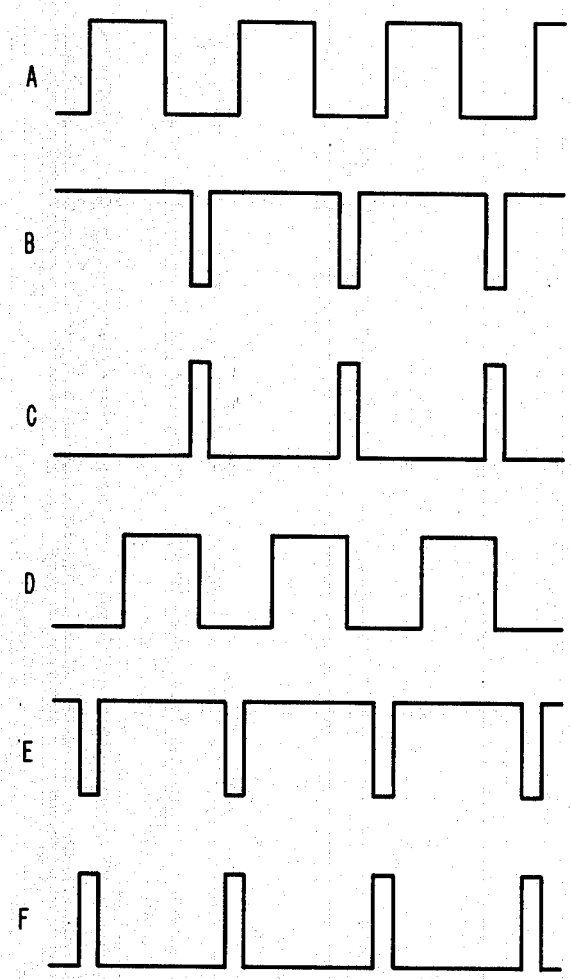
FIG. 2 illustrates waveforms of clock pulses employed in the apparatus of FIG. 1.

Information present in the TV signal processing circuitry 10 is applied to conventional 3.58 MHz generating circuitry to reconstitute the 3.58 MHz color subcarrier signal. The color subcarrier is applied to a first clock pulse generator 21 which produces a set of clock pulses A, B, and C as illustrated in FIG. 2 for controlling the operation of the elements of the R-Y channel 15. The color subcarrier is also applied through a 90° phase shifter 22 to a second clock pulse generator 23. The second clock pulse generator 23 produces a set of clock pulses D, E, and F as illustrated in FIG. 2 for controlling the operation of the elements of the B-Y channel 16.

The chrominance signal from the bandpass filter 12 is applied to a sample circuit 31 of a first path in the R-Y channel and to a sample circuit 32 of a second path of the R-Y channel. The sample circuits 31 and 32 are operated by clock pulses B from the clock pulse generator 21. The output of sample circuit 31 is applied to a first CCD delay line 33 and the sample circuit output 32 is applied to a second CCD delay line 34. The delay lines are operated by clock pulses A from the clock pulse generator 21. The delay lines 33 and 34 are serial arrangements of delay cells employing charge coupled devices (CCD) which are a well known type of charge transfer device. The first CCD delay line 33 in the first path introduces a predetermined delay T which may be very small. The second CCD delay line 34 in the second path introduces a delay which is greater than that of the first CCD line 33 by the horizontal line period H of the TV receiver; that is, the period of time to scan one horizontal line on the TV picture tube. In a conventional standard TV receiver this period H is 63.5 microseconds. To provide this delay differential with the delay cells clocked at the 3.58 MHz rate, the second CCD delay line 34 must have 227 ½ more cells than the first CCD delay line 33. In one specific embodiment the first CCD delay line 33 has one-half a delay cell and the second CCD delay line 34 has 228 delay cells.

The outputs of the CCD delay lines 33 and 34 are applied to a summing network 35. The output of the first CCD delay line 33 is a charge representing a sample of the chrominance signal, and the output of the second CCD delay line 34 is a charge representing the sample of the chrominance signal occurring one horizontal line period earlier. The combined charges are applied to an output sample-hold circuit 36 which is operated by clock pulses C from the clock pulse generator 21. The output of the sample-hold circuit 36 is a continuous R-Y color video signal.

The second channel 16 which produces the B-Y color signal is similar except that the elements are operated by clock pulses D, E, and F which are shifted 90° with respect to clock pulses A, B, and C, respectively. The chrominance signal from the bandpass filter 12 is applied to a sample circuit 41 of a first path and to a sample circuit 42 of a second path. These circuits are operated by clock pulses E from the clock pulse generator 23. The output of the first sample circuit 41 is applied to a first CCD delay line 43 which delays the samples applied thereto by the same amount T as the first CCD delay line 33 of the first channel 15. The output of the second sample circuit 42 is applied to a second CCD delay line 44 which delays the samples applied thereto by the amount T+H. The output of the first CCD delay line 43 and the delayed output of the second CCD delay line 44 are applied to a summing network 45 where they are combined. The resulting series of output pulses from the summing network 45 are applied to an output sample-hold circuit 46 which operates as a filter in response to clock pulses F from the clock pulse generator 23 to produce a continuous B-Y color video signal.

The R-Y and B-Y color video signals from the sample-hold circuits 36 and 46, respectively, are combined with the luminance signal Y in conventional circuitry labeled matrix 50. The luminance signal Y is appropriately delayed by an equalizing delay 51 so as to be properly combined with the R-Y and B-Y signals. The matrixing circuitry produces the third color video signal G-Y and the three color signals R, G, and B.

The demodulating apparatus as shown and described operates in the following manner to detect the color video signals from the chrominance signal while cancelling cross-color components. The composite video signal from the conventional TV processing circuitry 10 is separated into the chrominance and the luminance signals. The luminance signal passes through the lowpass filter 11 which blocks the chrominance signal and the chrominance signal passes through the bandpass filter 12 which blocks the luminance signal. However, as mentioned hereinabove certain of the higher frequency components of the luminance signal also pass through the bandpass filter 12 tending to cause the problem known as cross-color distortion.

The chrominance signal is sampled at the color subcarrier frequency rate by the sample circuits 31 and 32 in the R-Y channel 15. These samples are electrical charges which are proportional to the amplitude and the phase of the chrominance signal relative to the sampling. Thus, the input charges to the CCD delay lines 33 and 34 represent the synchronously detected chrominance signal. The difference in delay produced by the two CCD delay lines 33 and 34 is exactly the period of the horizontal line frequency. Thus, a charge representing a sample and the charge representing a sample occurring one horizontal scanning line earlier are applied to the summing network 35 which performs linear addition. On the assumption that there is no change in the chrominance and luminance information on adjacent lines in a scanning field, the charges representing the demodulated chrominance signals add. However due to the frequency interleaving principle in which the color subcarrier changes phase on alternate horizontal lines the demodulated high frequency luminance components present in the two charges cancel. The resulting charges free of unwanted luminance components are applied to the output sample-hold circuit 36 which functions as a lowpass filter to produce the continuous R-Y color difference signal free of cross-color effects.

The elements of the second channel 16 operate in a similar manner to demodulate the chrominance signal and to produce the B-Y color difference signal free of cross-color effects.

While there has been shown and described what is considered a preferred embodiment of the present invention, it will be obvious to those skilled in the art that various changes and modifications may be made therein without departing from the invention as defined by the appended claims.

What is claimed is:

1. In a television receiver producing a composite video signal, color demodulating apparatus including
   filter means for separating the chrominance signal from the other components of the composite video signal;
   clock means for producing first clock pulses at the color subcarrier frequency and second clock pulses at the color subcarrier frequency with a phase shift of 90° with respect to the first clock pulses;
   a first channel comprising
      first sampling means coupled to the filter means and to the clock pulse means, said first sampling means being operable to sample the chrominance signal in response to the first clock pulses;
      first delay means coupled to the first sampling means for providing separate first and second paths for each sample, the second path introducing a delay which is greater than the delay of the first path by an amount equal to the horizontal line period of the receiver;
      first summing means coupled to the first delay means for adding the samples from the first path to the samples from the second path to produce a series of output pulses;
      first output filtering means coupled to the first summing means for producing a continuous first color video signal from the series of output pulses from the first summing means;
   a second channel comprising
      second sampling means coupled to the filter means and to the clock pulse means, said second sampling means being operable to sample the chrominance signal in response to the second clock pulses;
      second delay means coupled to the second sampling means for providing separate first and second paths for each sample, the second path introducing a delay which is greater than the delay of the first path by an amount equal to the horizontal line period of the receiver;
      second summing means coupled to the second delay means for adding the samples from the first path to the samples from the second path to produce a series of output pulses;

second output filtering means coupled to the second summing means for producing a continuous second color video signal from the series of output pulses from the second summing means.

2. Color demodulating apparatus in accordance with claim 1 wherein said clock pulse means produces third clock pulses in phase with the first clock pulses and fourth clock pulses in phase with the second clock pulses;

said first delay means of said first channel includes a first serial arrangement of delay cells providing said first path;

a second serial arrangement of delay cells providing said second path;

said first and second serial arrangements of delay cells being coupled to said clock pulse means and being operable to transfer samples from cell to cell along each serial arrangement on each of said third clock pulses;

said second serial arrangement having a greater number of delay cells than the first serial arrangement by an amount equal to said color subcarrier frequency times the horizontal line period;

said second delay means of said second channel includes a third serial arrangement of delay cells providing said first path;

a fourth serial arrangement of delay cells providing said second path;

said third and fourth serial arrangements of delay cells being coupled to said clock pulse means and being operable to transfer samples from cell to cell along each serial arrangement on each of said fourth clock pulses;

said fourth serial arrangement having a greater number of delay cells than the third serial arrangement by an amount equal to said color subcarrier frequency times the horizontal line period.

3. Color demodulating apparatus in accordance with claim 2 wherein each of said delay cells is of the charge transfer type and each of said samples transferred along said serial arrangements for delay cells is in the form of an electrical charge representative of the magnitude of the sampled chrominance signal.

4. Color demodulating apparatus in accordance with claim 3 wherein said delay cells are of the charge coupled device type.

5. Color demodulating apparatus in accordance with claim 4 wherein said color subcarrier frequency is 3.58 MHz;

said horizontal line period is 63.5 microseconds;

said second serial arrangement of delay cells in each of said delay means contains 227 ½ more delay cells than said first serial arrangement.

6. Color demodulating apparatus in accordance with claim 5 wherein said first and second output filtering means each includes a sample-hold circuit operating at the rate of the color subcarrier frequency.

* * * * *